(12) United States Patent
Sun

(10) Patent No.: US 8,001,778 B2
(45) Date of Patent: Aug. 23, 2011

(54) TURBOCHARGED ENGINE CONTROL OPERATION WITH ADJUSTABLE COMPRESSOR BYPASS

(75) Inventor: Harold Huimin Sun, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1000 days.

(21) Appl. No.: 11/860,827

(22) Filed: Sep. 25, 2007

(65) Prior Publication Data

US 2009/0077968 A1 Mar. 26, 2009

(51) Int. Cl.
*F02B 33/44* (2006.01)
*F02M 25/07* (2006.01)

(52) U.S. Cl. ............ 60/605.2; 60/611; 123/568.11; 123/568.12

(58) Field of Classification Search ......... 60/605.2, 60/611; 123/568.11, 568.12, 568.21, 568.22; F02M 25/07
See application file for complete search history.

(56) References Cited

U.S. PATENT DOCUMENTS

| | | | |
|---|---|---|---|
| 6,701,710 B1 | 3/2004 | Ahrens et al. | 60/605.2 |
| 6,804,952 B2 | 10/2004 | Sasaki et al. | 60/285 |
| 6,938,419 B2 | 9/2005 | Okuyama et al. | 60/611 |
| 6,983,597 B2 | 1/2006 | Wild et al. | 60/611 |
| 7,080,511 B1 * | 7/2006 | Bolton et al. | 60/611 |
| 7,222,615 B2 * | 5/2007 | Buck et al. | 60/605.2 |
| 7,261,086 B2 * | 8/2007 | Nuang | 123/436 |
| 7,284,544 B2 * | 10/2007 | Hatano | 123/568.12 |
| 7,389,173 B1 * | 6/2008 | Wang | 701/103 |
| 7,480,557 B2 * | 1/2009 | Yamaguchi et al. | 701/108 |
| 7,565,237 B2 * | 7/2009 | Wang | 701/103 |
| 7,621,128 B2 * | 11/2009 | Czarnowski et al. | 60/605.2 |
| 7,793,500 B2 * | 9/2010 | Igarashi | 60/611 |
| 7,861,580 B2 * | 1/2011 | Sujan et al. | 73/114.77 |
| 2008/0149080 A1 * | 6/2008 | Reuss et al. | 123/568.12 |
| 2008/0163855 A1 * | 7/2008 | Matthews et al. | 60/605.2 |
| 2008/0276916 A1 * | 11/2008 | Sekfane | 123/568.21 |
| 2009/0025698 A1 * | 1/2009 | Reuss et al. | 123/568.12 |
| 2009/0044789 A1 * | 2/2009 | Eitel et al. | 123/568.12 |
| 2009/0223219 A1 * | 9/2009 | Joergl et al. | 60/605.2 |
| 2009/0260605 A1 * | 10/2009 | Janssen et al. | 123/568.12 |
| 2009/0266345 A1 * | 10/2009 | Sasaki et al. | 123/568.22 |
| 2010/0154412 A1 * | 6/2010 | Andreae et al. | 60/605.2 |
| 2010/0180591 A1 * | 7/2010 | Cornwell et al. | 60/611 |

FOREIGN PATENT DOCUMENTS

| | | | |
|---|---|---|---|
| EP | 1365125 | | 4/2003 |
| JP | 2002285824 | | 10/2002 |
| JP | 2008274833 | A * | 11/2008 |
| JP | 2010096161 | A * | 4/2010 |
| WO | WO 2006136790 | A2 * | 12/2006 |
| WO | WO 2006137279 | A1 * | 12/2006 |

OTHER PUBLICATIONS

ISA United Kingdom, International Search Report of GB0816115.0, Dec. 17, 2008, 1 page.

* cited by examiner

*Primary Examiner* — Thai Ba Trieu
(74) *Attorney, Agent, or Firm* — Julia Voutyras; Alleman Hall McCoy Russell & Tuttle LLP

(57) ABSTRACT

A method of operating an engine having a turbocharger and a high pressure EGR system is provided. A recirculation valve of the turbocharger's compressor is adjusted along with the throttle at different airflow conditions.

16 Claims, 4 Drawing Sheets

TURBOCHARGED ENGINE CONTROL OPERATION WITH ADJUSTABLE COMPRESSOR BYPASS

BACKGROUND AND SUMMARY

The effectiveness of an emission control system in a lean-burn internal combustion engine can be improved by increasing the temperature of the effluent flowing into the emission control system. For example, raising the temperature of the exhaust gas can improve the absorption efficiency of lean NOx traps (LNT), which may reduce tailpipe emissions from the vehicle. The temperature of the effluent can be raised by incorporating an exhaust gas recirculation (EGR) system, which recycles a portion of the engine effluent to the engine intake passage. For example, combustion systems utilizing higher EGR flow rates may exhibit lower combustion temperatures and higher exhaust temperatures.

In turbocharged diesel engines, throttling the fresh air intake while introducing heated, pressurized recirculated exhaust to the engine intake manifold may be used to increase exhaust temperature. However, such operation may also cause the compressor to stall or surge. The low mass flow rate through the compressor, in combination with the high pressure ratio of the compressor, can create a flow instability inside the compressor. The resulting "compressor surge" can cause damage to the turbocharger, and the fluctuations in air flow out of the compressor can affect the air to fuel ratio, which can ultimately affect the combustion stability of the engine.

The above issue may be addressed by, in one example, a method of operating a compressor recirculation valve on an engine having a throttle coupled to the turbocharger. The engine may include a high pressure exhaust gas recirculation (EGR) system for recirculating cooled and un-cooled exhaust gas from upstream of a turbine of the turbocharger in an exhaust to downstream of a compressor of the turbocharger in an intake. The compressor may have a recirculation passage with a recirculation valve coupled therein. The method may comprise during a first engine airflow condition:

delivering at least some high pressure un-cooled EGR to the intake, downstream of the compressor, operating the throttle at a first throttle amount, and operating the compressor bypass valve at a first bypass amount to increase exhaust gas temperature; and during a second engine airflow condition higher than the first engine airflow:

delivering at least some high pressure cooled EGR to the intake, downstream of the compressor, operating the throttle at a second throttle amount more open than the first amount, and operating the compressor bypass valve at a second bypass amount more closed than the first amount.

For example, during the first condition, by recirculating air through the compressor at its inlet the compressor still pumps air even though the recirculated air does not go through engine. Such operation therefore does not further increase intake manifold pressure, thereby reducing a likelihood of surge. Further, by pumping extra air, the compressor flow is increased, also decreasing a likelihood of surge. Further still, recirculating air through the compressor also helps maintain loading on turbine thus maintaining sufficient turbine inlet pressure to pump the high pressure EGR to the intake and thereby enable increased exhaust gas temperature for maintaining activation of an exhaust catalyst.

As another example, by adjusting intake throttling as described during the first condition, it may be possible to provide sufficient pressure differential so that increased EGR and/or near stoichiometric combustion can be achieved to also increase exhaust temperature.

As still another example, by adjusting operation as described during the second condition, high engine efficiency and engine output can be achieved when desired. In this way, overall engine operation may be improved during both higher and lower airflow operation.

Thus, adjustable recirculation of air into the compressor inlet can be used to address surge issues that primarily occur at lower airflows where higher un-cooled EGR may be used to advantage.

DETAILED DESCRIPTION

Figure 1:
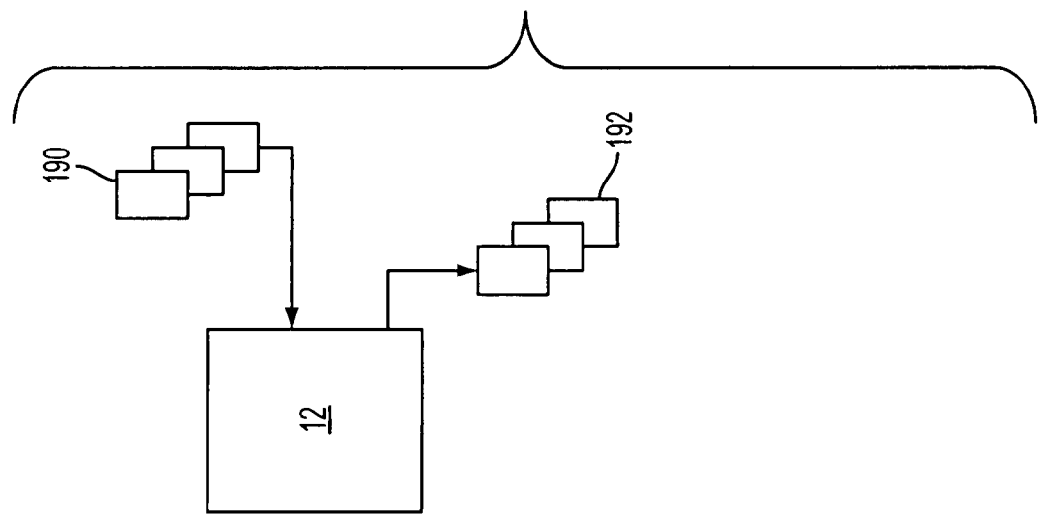
FIG. 1 illustrates a simplified turbocharged diesel engine 10 according to an embodiment of the invention.
Figure 1:
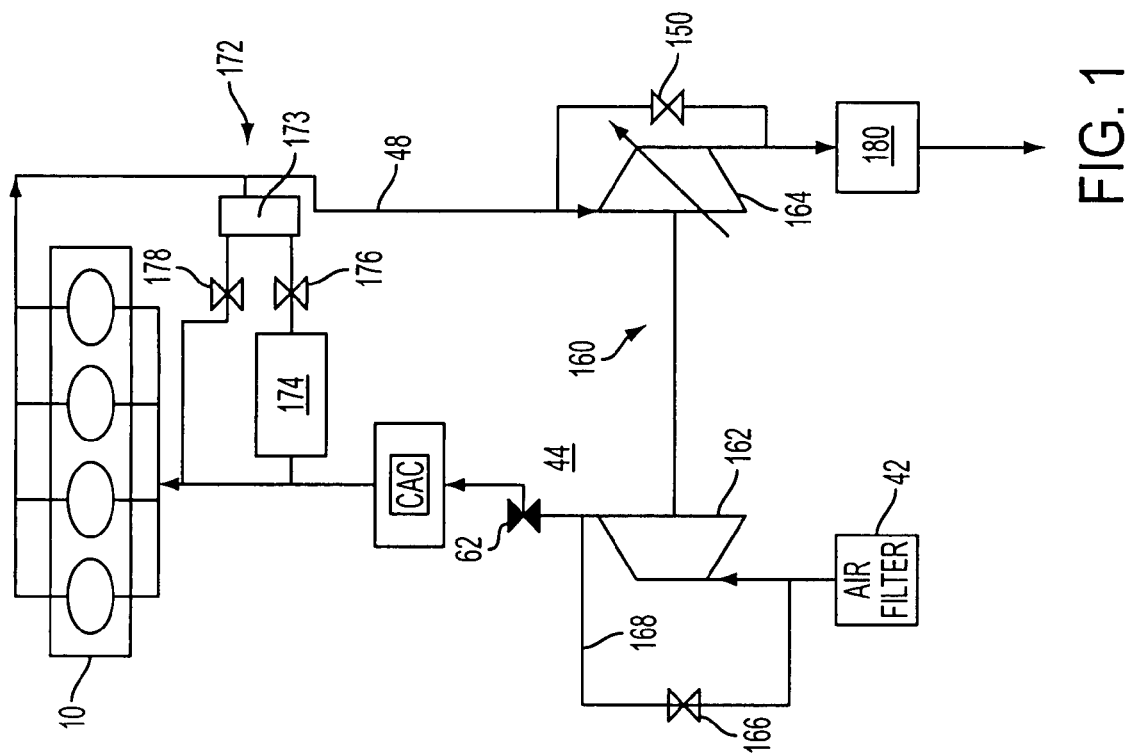

Engine 10 may include a turbocharger 160 with compressor 162, which may receive intake air from air filter 42 and expel charged air into intake passage 44. Compressor 162 may be connected to turbine 164 by a shaft which may communicate the motion of turbine 164 to compressor 162. Compressor 162 may be fluidly coupled to recirculation loop 168, which may bypass the compressor that delivers flow from air filter 42 to intake passage 44. Recirculation loop 168 may include a bypass valve 166. Bypass valve 166 may be controlled by controller 12 to control the flow rate of air recirculated between the outlet of the compressor and the inlet of the compressor.

Turbine 164 may include a variable geometry turbine in which the geometry of the turbine may be adjusted during engine operation by controller 12. Alternatively, or in addition, an adjustable wastegate 150 may be used so that controller 12 may adjust an amount of exhaust gas bypassing the turbine, based on operating conditions of the engine. Further, an emission control device 180 may be coupled downstream of turbine 164. The device may include a particulate filter, NOx trap, NOx catalyst, Urea SCR catalyst, or various others or combinations thereof.

Intake passage 44 may be fluidly coupled to exhaust gas recirculation (EGR) loop 172, which may communicate with exhaust passage 48 upstream of turbine 164. EGR loop 172 may include a heat transfer device 174. Heat transfer device 174 may be a heat exchanger, such as an EGR cooler. EGR loop 172 may also include a catalyst 173 such as an oxidation catalyst or various other EGR catalyst types, or combinations thereof. EGR loop 172 may also communicate with a control valve 176, which may be operated to control the flow rate of exhaust gas through the EGR loop 172. Control valve 176 may be controlled by controller 12 to control the flow rate of exhaust gas through EGR loop 172. Further, an EGR bypass valve 178 may also be included for delivering exhaust gas to the intake that bypasses heat exchanger device 174.

While not shown in FIG. 1, the system may include a high pressure diesel fuel injection system for delivering injected fuel to cylinders of the engine. The system may be a common rail system, for example, such that injection timing may be adjusted based on engine operation.

Intake manifold 42 may include a throttle 62 having a throttle plate (not shown). In this particular example, the position of the throttle plate may be varied by controller 12 via a signal provided to an electric motor or actuator included with throttle 62, a configuration that is commonly referred to as electronic throttle control.

A control system may include controller 12, shown in FIG. 1 as a microcomputer, including a microprocessor unit, input/output ports, an electronic storage medium for executable programs and calibration values in read-only memory, random access memory, keep-alive memory, and a data bus. Controller 12 may receive various signals from sensors 190 coupled to engine 10, in addition to those signals previously discussed, including measurement of inducted air mass flow rate from mass air flow (MAF) sensor; engine coolant temperature (ECT); engine speed, throttle position (TP) from a throttle position sensor; and manifold absolute pressure (MAP) from a manifold pressure sensor. Controller 12 may also contain stored control algorithms for operating various devices in response to signals or combinations of signals received from various sensors coupled to engine 10. Finally, controller 12 may send various signals to actuators 192 in engine 10, such as valves 166, 176, 178, 62, 150, and others.

Figure 2:
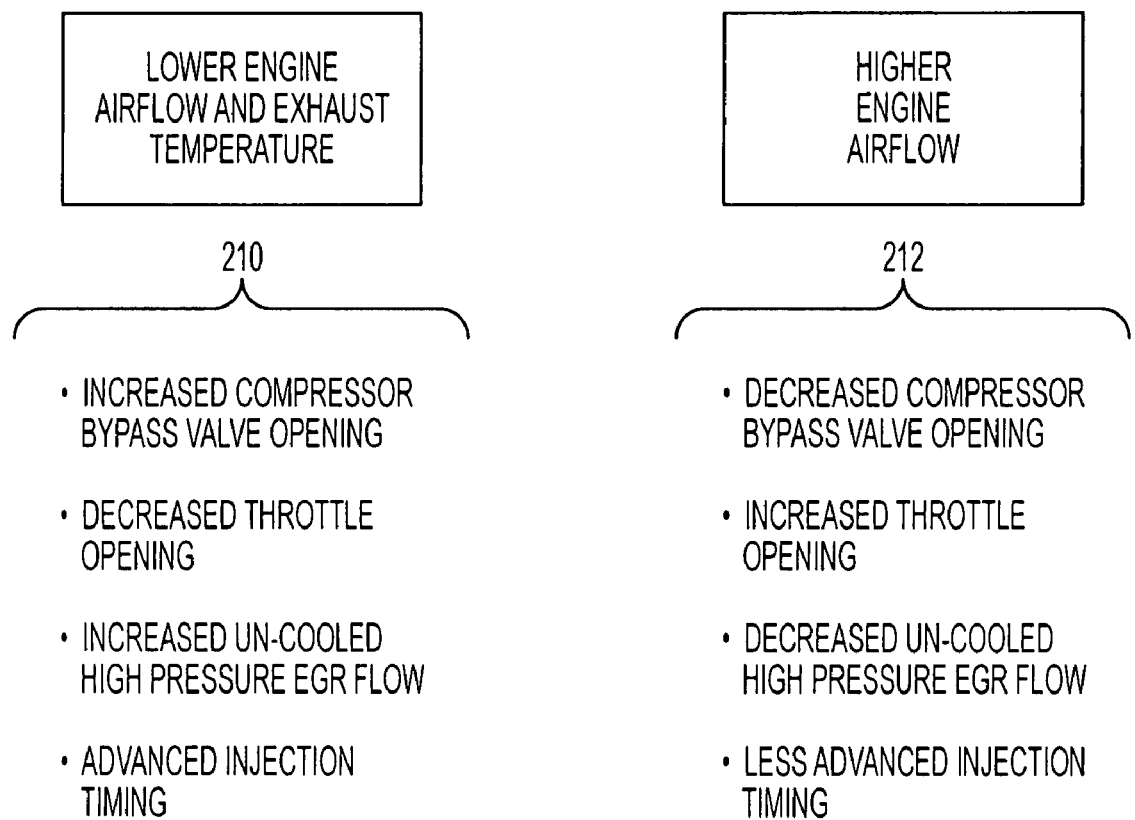
FIGS. 2-3 illustrate example high-level flowcharts and diagrams illustrating example operation.
Figure 3:
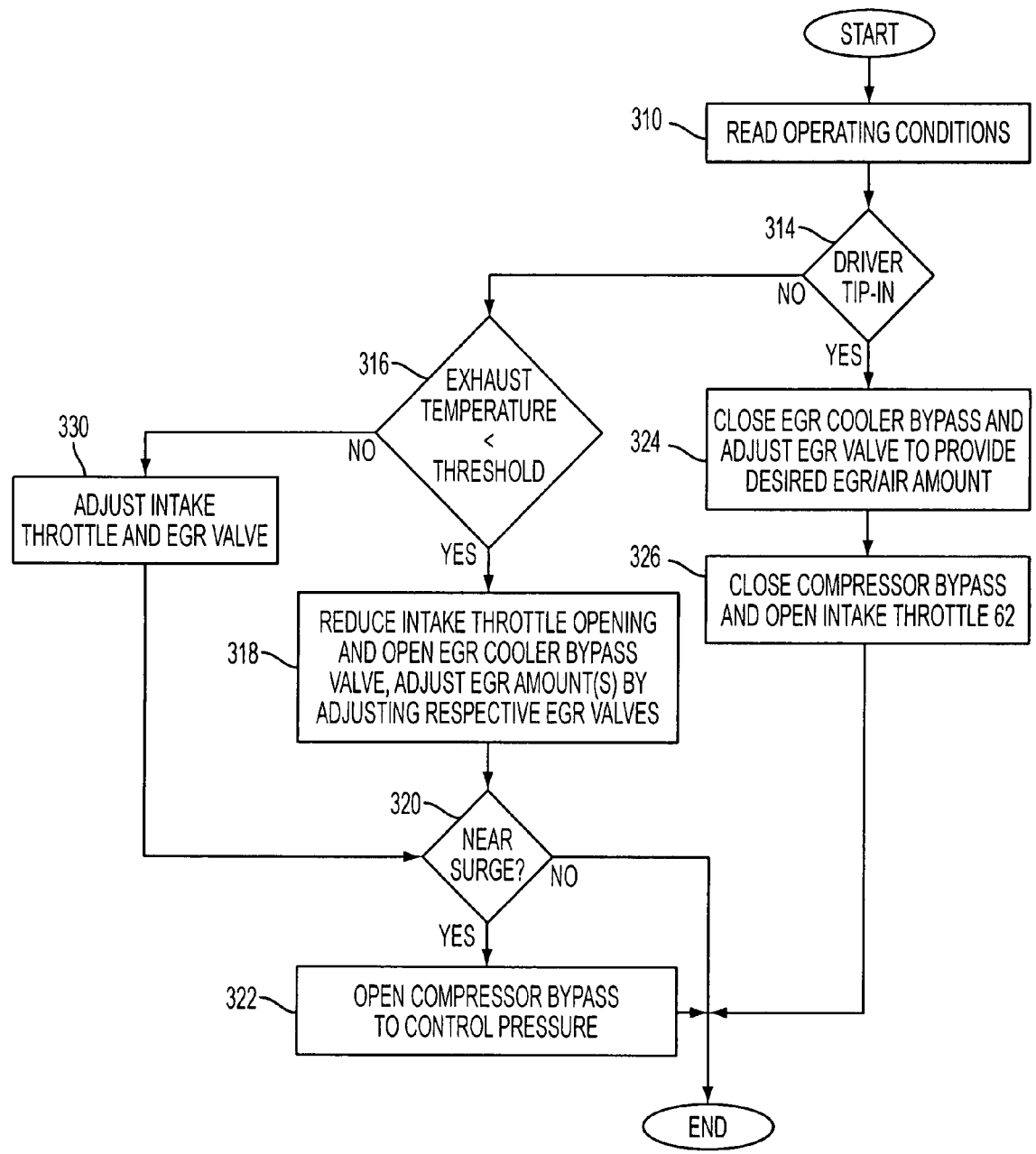

As described further herein, the control system may control engine operation based on various operating conditions to provide various operations, such as illustrated in FIGS. 2-3.

Referring now specifically to FIG. 2, a diagram illustrates differing operation for higher airflow (212) and lower airflow when exhaust temperature may be too low (210), while taking into account issues related to compressor surge. In particular, the diagram illustrates how the intake throttle 62 may be used to limit air flow for stoichiometric or rich combustion while valves 176 and 178 can be adjusted to provide un-cooled high pressure EGR through an EGR catalyst to raise intake manifold temperature and therefore exhaust temperature. For example, such operation may increase exhaust temperature dramatically, and thereby provide a significant effect on exhaust catalyst efficiency that is impacted by exhaust temperature.

However, higher intake restrictions (due to intake throttling) combined with high intake manifold temperatures may cause high compressor pressure ratios at lower flow rates—a perfect condition for compressor surge. Such surging operation may increase noise, vibration, and harshness (NVH), combustion stability and turbocharger high cycle fatigue degradation.

Such issues can be at least partially addressed as shown by the various features of operation illustrated in FIG. 2. For example, to address surge when providing EGR during low airflows (e.g., when increasing exhaust temperature), adjustment of the compressor recirculation valve 166 may be used, in coordination with throttle and EGR valve(s) adjustments. Valve 166 may be adjusted to route part of the air from the compressor outlet back to the compressor inlet so that the compressor has a lower pressure ratio that it otherwise would have, while still providing higher mass flow into compressor and higher turbo speed. Such operation moves away from the surge line. Further, such operation provides a lower temperature drop across turbine 164 due to the lower load on the compressor side, thereby further increasing turbine out gas temperature. Further still, such operation provides sufficient pressure differential between turbine and compressor to pump the high pressure EGR desired.

Additionally, during a transient tip-in operation, the throttle 62 can be opened while valve 166 closed (and also valves 178 and 176 may also be closed), so that the higher turbocharger speed results in extra fresh air delivered into manifold for prompt acceleration. Further, during higher flows or tip-in conditions, the compressor bypass can be closed to enable high EGR flows or quick manifold filling during tip-in conditions. Such operation can thus decrease both turbo-lag, as well as manifold filling delays so that sufficient air is present during the transient condition so that increased fuel injection can rapidly deliver the requested torque with reduced smoke.

Specifically, at 210, various example actions are illustrated, although note that additional actions may also be used. These include:

Increased compressor bypass valve 166 opening (thus increasing recirculation of air from the compressor outlet to the compressor inlet)

Decreased throttle valve opening (thus decreasing airflow through the throttle 62)

Increased (cooled and/or un-cooled) high pressure EGR flow; and/or advanced fuel injection timing.

The decreased throttle opening can be used to increase exhaust temperature by increasing engine pumping work, reducing air-fuel ratio, and increase EGR flow. Further, the EGR flow may be increased by increasing opening of one or both of valves 176 and 178. In one particular example, the exhaust temperature may be increased by providing more un-cooled EGR, and further increased EGR amounts may be used to offset the NOx effects of un-cooled EGR. Also, the relative amounts of cooled and un-cooled EGR may be adjusted based on a desired exhaust temperature and/or other operating conditions. Further, when compressor surge conditions may be present, the bypass valve 166 may be adjusted to move operation away from surge. Finally, advanced and large pilot injections may be used to provide low temperature combustion that offset engine combustion efficiency losses caused by higher pumping work and incomplete combustion.

On the other hand, at 212 where higher airflows may be desired, alternative actions are illustrated, (again note that additional actions may also be used). These include:

decreased compressor bypass valve 166 opening, including closed (thus decreasing or shutting off recirculation of air from the compressor outlet to the compressor inlet)

increased throttle valve opening decreased un-cooled high pressure EGR flow (but optionally higher overall EGR flow may be used, such as increased cooled EGR flow, depending on operating conditions); and/or less advanced and/or more retarded fuel injection timing.

The decreased compressor bypass and increased throttle opening enable both high EGR flow (which may be primarily cooled EGR) and higher airflows for higher engine output. The higher engine flow conditions may include both steady state high flow, as well as transitions from lower to higher flows, such as during a tip-in and/or vehicle launch condition from idle.

One method of controlling a performance of an internal combustion is shown in FIG. 3, a high-level flowchart that describes an example routine for operating the intake throttle, compressor bypass valve, EGR control valves, and/or fuel injection parameters in response to engine operation.

First, in 310, the routine reads operating parameters, such as exhaust temperature, engine speed, airflow, operator demand, and various others. Then, at 314, the routine determines whether a driver tip-in transient condition is present, such as at tip-in from idle during vehicle launch from low vehicle speeds. If not, the routine continues to 316 to determine whether exhaust temperature is less than a threshold minimum value (e.g., too low), which may be below a catalyst activation temperature of device 180.

When the exhaust temperature is too low, the routine continues to 318 to close EGR valve 176 (e.g., reduce its opening, or fully close the valve) and open EGR cooler bypass valve 178 (e.g., increase its opening, or open it from the closed position). In one example, the routine may adjust the total EGR amount and combined EGR temperature delivered to the intake by adjusting the relative amounts of cooled and un-cooled EGR by adjusting both valves 176 and 178. For example, if the highest temperature EGR is desired, and flow through valve 178 can meet the overall EGR flow desired, then valve 176 can be fully closed. However, if the desired EGR temperature is below that of the un-cooled EGR, EGR flow from both valves 176 and 178 may be provided, and so on.

If the turbine out temperature is sufficient for the function of aftertreatment, no EGR cooler bypass is needed and EGR valve and intake throttle can be used to adjust required EGR rate as in 330.

Next, in 320, the routine determines whether the compressor is near a surge condition. For example, as described further with regard to FIG. 4, the routine may monitor the compressor pressure ratio and total flow through the compressor. In one example, the routine may monitor whether the compressor flow (which may be indicated via a MAF sensor) falls below a threshold level, and/or whether the pressure difference across the compressor rises above a threshold level. If so, the routine may continue to 322 where bypass valve 166 is adjusted in response thereto. For example, valve 166 may be opened (or opened further) in response to such conditions.

Alternatively, when the answer to 314 is yes, or when the answer to 316 is no, the routine continues to 324. In 324, the routine closes the EGR bypass 178 and adjusts valve 176 to provide a desired EGR flow amount (which may be high or low compared to the total EGR flow during lower airflow conditions). While this example uses substantially only cooled EGR during higher airflow operation, both cooled and un-cooled EGR may also be used. Also, the routine may provide no EGR during selected conditions, such as in response to a transient tip-in. Then, in 326, the routine closes the compressor bypass 166 (e.g., reduces its opening, and/or moves it to a closed position) and opens intake throttle 62.

In this way, it is possible to enable high EGR flow during steady higher airflow conditions to achieve desired engine efficiency and emission targets. However, it is also possible to enable the compressor bypass operation while avoiding transient tip-in response degradation. In one example, as described herein, various transient issues may be present during loading and unloading of a turbocharged engine that operates with throttled intake air, EGR, and recycled charged air to avoid compressor surge. In particular, there may be undesirable delays in responding to a demand for a higher load on the engine during such operation due to the reduced availability of fresh air to the engine in combination with the reduction in boost created by recycling a portion of the charged air to the inlet of the compressor. Therefore, as shown in FIG. 3, for example, the coordinated response of increasing engine power while reducing compressor air recycling enables already available fresh air from the already spinning turbocharger to be used for torque generation.

Figure 4:
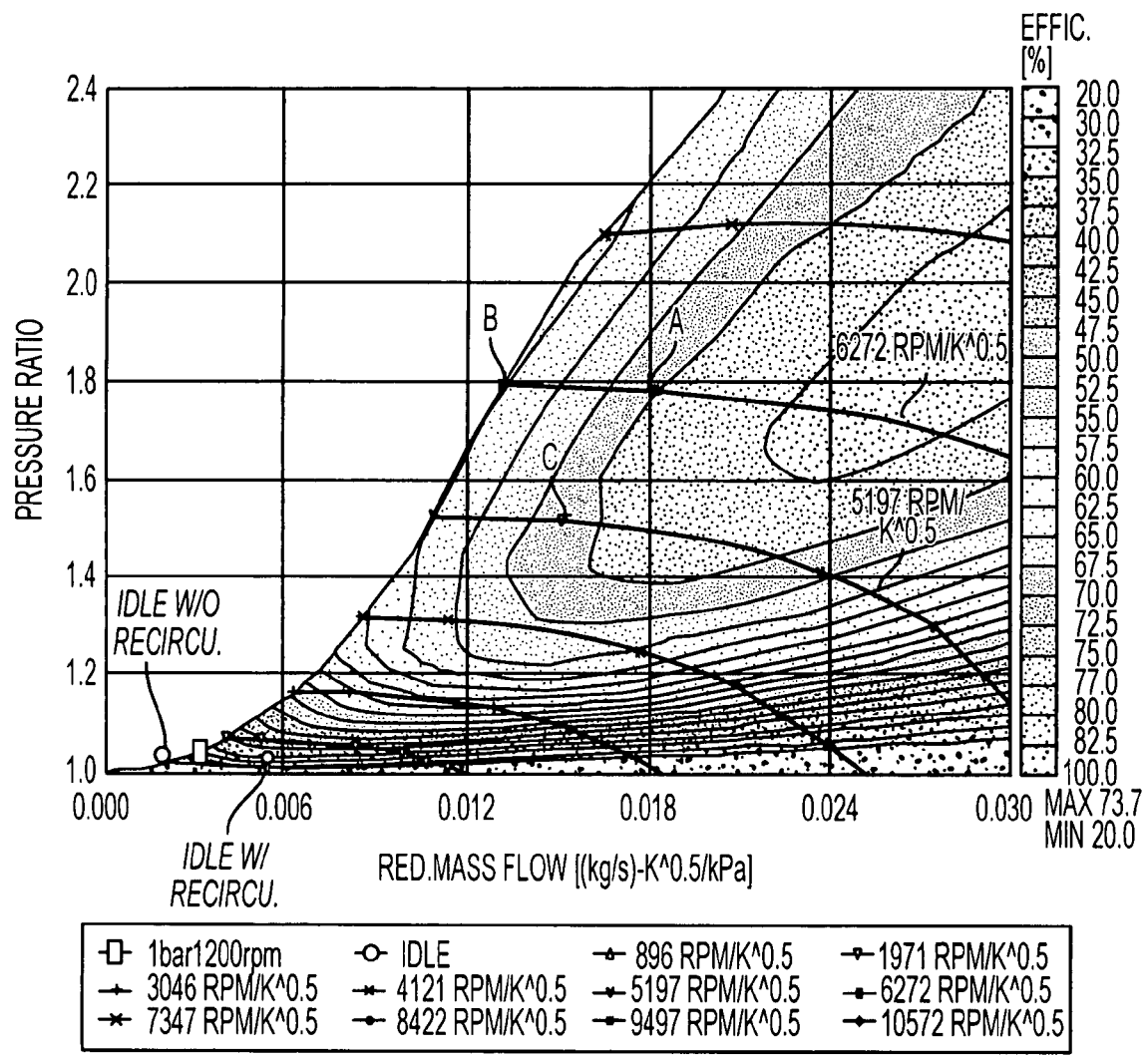
FIG. 4 illustrates example processed compressor performance data.

FIG. 4 illustrates an exemplary pressure vs. mass flow rate relationship for a compressor. The illustration depicts an operating window for a compressor which is bounded by the right hand vertical axis, the bottom horizontal axis, and a curve representing a compressor surge threshold and encloses compressor efficiency contours (represented by shaded terraces) and compressor speed isolines (represented by solid black lines).

For example, the compressor operating condition indicated by A on FIG. 4 has a reduced compressor speed of 6272 RPM/K^0.5, a reduced mass flow rate of 0.018 kg/s-K^0.5/kPa, and a pressure ratio of about 1.8. It may be desirable to decrease the mass air flow rate of fresh air entering the engine. In this example, when the mass flow rate of air through the compressor is reduced to 0.013 kg/s-K^0.5/kPa and the compressor speed is held constant (the conditions represented by B), the compressor will be operating on the surge threshold and may experience a surge (as indicated, idle operation with un-cooled EGR may be on or past the surge threshold).

However, a potential compressor surge may be addressed, for example, by decreasing the pressure ratio across the compressor and/or increasing the mass flow rate through the compressor. The conditions represented by C provide an example of how a potential compressor surge might be addressed by increasing the flow of air through the recirculation line between the outlet and the inlet of the compressor. For example, if it is desirable to introduce 0.013 kg/s-K^0.5/kPa from the fresh air intake, establishing a recirculation loop flow rate of 0.002 kg/s-K^0.5/kPa and reducing the compressor speed from 6272 RPM/K^0.5 to 5197 RPM/K^0.5 will maintain the compressor efficiency present at condition A. Moving to condition C will reduce the pressure ratio across the compressor to about 1.5 without changing the amount of fresh air introduced to the fresh air intake while moving the compressor operating conditions away from the surge threshold. Again, example idle operation with compressor recycling is illustrated as inside the surge threshold).

In the case where the compressor is coupled in a turbocharger, it may also be desirable to have a lower pressure ratio across the compressor to reduce the load on the turbine, which in turn may result in less of an exhaust gas temperature drop across the turbine. For example, some emission control devices, such as treatment catalysts or lean NOx traps, may depend in part on the energy present in the incoming exhaust gas flow to achieve conversion reaction activation or to achieve greater conversion efficiency. Alternatively, when it is desirable to maintain the compressor speed at 6272 RPM/K^0.5, establishing a recirculation loop flow rate of 0.005 kg/s-K^0.5/kPa will effectively move the compressor operating condition back to A while preserving a fresh air intake mass flow rate of 0.013 kg/s-K^0.5/kPa. For example, it may be desirable to maintain a compressor speed to avoid a delay in boost generation as the compressor rotor is accelerated from a slower speed to a desired faster speed (sometimes called "turbo lag").

It will be appreciated that the configurations and routines disclosed herein are exemplary in nature, and that these specific embodiments are not to be considered in a limiting sense because numerous variations are possible. The subject matter of the present disclosure includes all novel and non-obvious combinations and subcombinations of the various system and exhaust configurations, algorithms, and other features, functions, and/or properties disclosed herein. The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method of operating an engine coupled to a turbocharger, the engine having a high pressure exhaust gas recirculation (EGR) system for recirculating exhaust gas from upstream of a turbine of the turbocharger in an exhaust to downstream of a compressor of the turbocharger in an intake, the compressor having a recirculation passage with a compressor bypass valve coupled therein, the engine intake further having a throttle, the method comprising:

during a first, low, engine airflow condition delivering at least some high pressure EGR to the intake, operating the throttle at a first throttle opening amount, and operating the compressor bypass valve at a first bypass opening amount to increase exhaust gas temperature and reduce compressor surge while maintaining turbocharger rotational speed; and in response to a driver pedal tip-in, reducing the first bypass opening amount to a second, lesser, bypass opening amount, increasing the first throttle opening amount to a second, greater, throttle opening amount, and reducing an amount of high pressure un-cooled EGR.

2. The method of claim 1 further comprising delivering exhaust gas to a catalyst in the engine's exhaust.

3. The method of claim 2 wherein the first engine airflow condition includes exhaust temperature being less than a threshold, and where the at least some high pressure EGR includes un-cooled EGR.

4. The method of claim 3 wherein the first engine airflow condition includes engine idling operation.

5. A method of operating an engine coupled to a turbocharger, the engine having a high pressure exhaust gas recirculation (EGR) system for recirculating cooled and un-cooled exhaust gas from upstream of a turbine of the turbocharger in an exhaust to downstream of a compressor of the turbocharger in an intake, the compressor having a recirculation passage with a compressor bypass valve coupled therein, the engine intake further having a throttle, the method comprising:

during a first engine airflow condition:
delivering at least some high pressure un-cooled EGR to the intake, downstream of the compressor, operating the throttle at a first throttle amount, and operating the compressor bypass valve at a first bypass amount to increase exhaust gas temperature; and during a second engine airflow condition higher than the first engine airflow condition:
delivering at least some high pressure cooled EGR to the intake, downstream of the compressor, operating the throttle at a second throttle amount more open than the first throttle amount, and operating the compressor bypass valve at a second bypass amount more closed than the first bypass amount.

6. The method of claim 5 where the second engine airflow condition is provided in response to a driver pedal tip-in.

7. The method of claim 5 further comprising adjusting fuel injection timing during the first engine airflow condition to advance fuel delivery to the engine.

8. The method of claim 5 further comprising delivering un-cooled EGR flow by bypassing an EGR cooler in the EGR system.

9. The method of claim 5 further comprising delivering at least some cooled EGR without un-cooled EGR during the second engine airflow condition.

10. The method of claim 5 wherein more un-cooled EGR is delivered during the first engine airflow condition than during the second engine airflow condition.

11. The method of claim 5 wherein the compressor bypass valve is fully closed during the second engine airflow condition.

12. The method of claim 5 wherein the compressor bypass valve is fully opened during the first engine airflow condition.

13. The method of claim 5 wherein engine air-fuel ratio is substantially stoichiometric or rich during the first engine airflow condition.

14. The method of claim 5 further comprising adjusting a first and second EGR valve coupled in the EGR system to adjust a relative amount of cooled and un-cooled EGR delivered to the engine intake.

15. The method of claim 5 where the first engine airflow condition occurs during a low exhaust temperature condition that is below a threshold catalyst activation temperature.

16. A system for a vehicle having an internal combustion engine with an intake and an exhaust, comprising:

a turbocharger having a compressor in the engine intake and a turbine in the engine exhaust;

a high pressure exhaust gas recirculation (EGR) system for recirculating exhaust gas from upstream of the turbine to downstream of the compressor, the EGR system including a first passage for delivering un-cooled EGR controlled by a bypass EGR valve and a second passage for delivering cooled EGR having a cooler and controlled by an EGR valve, the EGR system further having an EGR catalyst;

a recirculation passage with a compressor bypass valve coupled around the compressor of the turbocharger;

a throttle coupled in the engine intake;

a control system for, when catalyst temperature is lower than a threshold, delivering more high pressure un-cooled EGR than high pressure cooled EGR through the EGR catalyst and then to the engine intake, throttling intake air, and bypassing at least some air around the compressor via the recirculation passage; and in response to tip-in, increasing intake air throttling and reducing compressor bypassing.

* * * * *